A. L. RIGGS.

SPARK PLUG.

APPLICATION FILED JUNE 17, 1918.

Reissued Oct. 15, 1918.

14,538.

WITNESSES

J. Hobart Bradley.

Glenn H. Kirsche.

INVENTOR

Alfred Leander Riggs

By Fred'k H. Winter,

Attorney.

UNITED STATES PATENT OFFICE.

ALFRED LEANDER RIGGS, OF PITTSBURGH, PENNSYLVANIA, ASSIGNOR TO VISIBLE SPARK PLUG COMPANY, A CORPORATION OF DELAWARE.

SPARK-PLUG.

14,538. Specification of Reissued Letters Patent. Reissued Oct. 15, 1918.

Original No. 1,265,513, dated May 7, 1918, Serial No. 198,941, filed October 29, 1917. Application for reissue filed June 17, 1918. Serial No. 240,511.

*To all whom it may concern:*

Be it known that I, ALFRED LEANDER RIGGS, a citizen of the United States, now residing at Pittsburgh, county of Allegheny, and State of Pennsylvania, have invented new and useful Improvements in Spark-Plugs, of which the following is a specification.

This invention relates to spark plugs and has for its object the provision of a spark plug in which it is possible to determine at a glance whether or not current is being fed to the electrodes or being short circuited for any of the usual reasons.

The present invention is an improvement on that shown in my Patent No. 1,247,012 of November 20, 1917 and my application filed January 23, 1917, Serial No. 143,793.

The primary object of the present invention is to provide a spark plug of the above class in which provision is made for the escape of ozone formed by the electric spark, so as to prevent discoloration of the glass through which the spark is visible.

Another object is to provide novel means for securing the glass in position so as to provide for a slight variation in the diameter of the insulating core of the plug, in order to permit the assembling of the parts.

Other objects and advantages of the invention will be apparent when the following description is read in connection with the accompanying drawings, in which—

Referring to the drawings in detail, like characters of reference denote corresponding parts throughout the several views.

Figure 1:
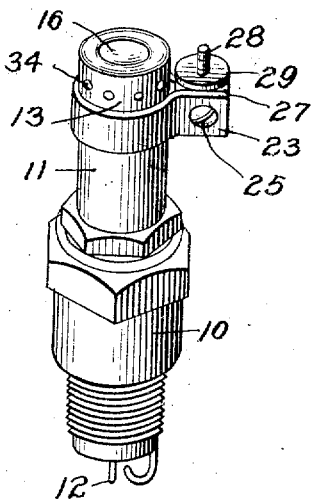
Figure 1 is a perspective view of the spark plug embodying the present invention.
Figure 2:
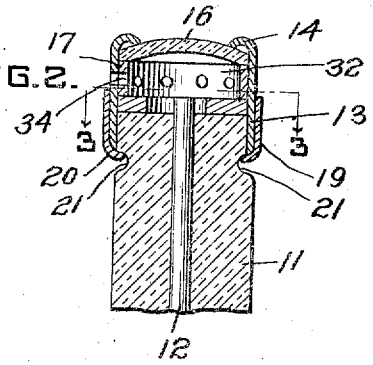
Fig. 2 is a transverse vertical sectional view taken through the upper portion of the porcelain core.
Figure 3:
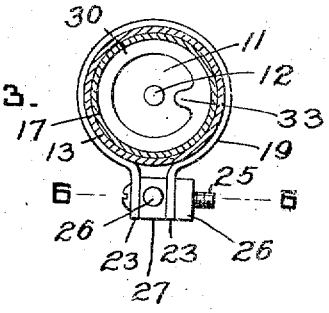
Fig. 3 is a horizontal sectional view on the line 3—3 of Fig. 2.
Figure 6:
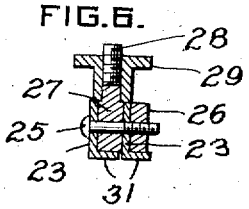
Fig. 6 is a sectional view on the line 6—6 of Fig. 3 illustrating the means for preventing the accidental turning of the securing nut and the terminal block.
Figure 4:
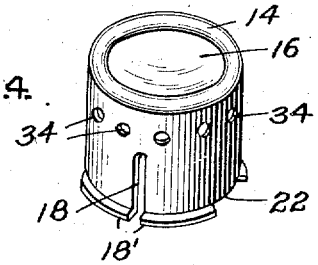
Fig. 4 is a detail perspective view of the removable cap.
Figure 7:
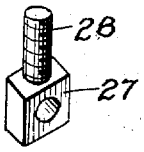
Fig. 7 is a detail perspective view of the terminal block.
Figure 5:
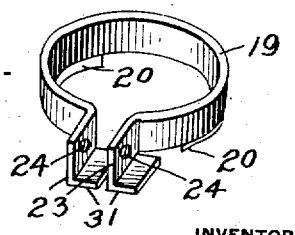
Fig. 5 is a similar view of the clamping band.

In the drawings, there is illustrated a spark plug 10, provided with an insulating core 11, through which extends one of the electrodes 12, the said electrode projecting beyond the surface of the core.

Mounted upon the core 11 is a cap 13, one end of which is provided with an inwardly extending flange 14, which surrounds an opening formed in the cap. This opening is closed by a disk 16 formed of glass or other transparent material, this disk being held in position by means of the retaining ring 17 fitted within the cap 13 and bearing against the under edge of the glass.

The cap 13 is split as shown at 18, in order that it may accommodate itself to insulating cores of slightly different diameter. This cap is further provided at the end opposite the glass 16 with an outwardly turned flange 18′, which is adapted for engagement with one end of a clamping band 19. The band 19 extends around the cap and has formed thereon at diametrically opposite points, inwardly extending engaging lugs 20, which are adapted to engage an annular groove 21 formed in the insulating core 11. The lugs 20 in addition to engaging the groove 21, pass through recesses 22 formed in the flange 18′ at diametrically opposite points, these lugs engaging beneath the edge of the cap 13 at these points, while the flange 18′ engages beneath the adjacent edge of the band 19, so that when the said band is secured in position the cap will be effectually held in position upon the core.

Formed upon the band 19 are oppositely extending parallel portions 23, which are provided with alined openings 24, a screw 25 being passed through these openings for engagement with a nut 26, by means of which the band is tightly secured upon the cap. Mounted upon the screw 25 is a terminal block 27, which has projecting therefrom a threaded stud 28, a binding nut 29 being positioned upon this stud by means of which the electrical conductor for the feed ring 30 is connected to the plug. The outwardly extending portions 23 are formed with laterally extending locking flanges 31, which are adapted to engage one edge of the nut 26 and the block 27, respectively, to hold these elements against turning.

The glass top 16 of the cap 13 is spaced by the ring 17 from the top of the insulating core 11, so as to provide an electrode chamber 32, within which extends the electrode 12 previously mentioned and the electrode 33 carried by the feed ring 30. One of the most important features of the invention resides in providing ventilating means for this chamber, in order to prevent discoloration of the glass 16 by the ozone from the electric spark within the chamber. To this end the sides of the cap 13 are formed with ventilating openings 34, preferably arranged around the cap, the spacing ring 17 also being provided with similar openings, so as to permit the escape of the ozone and to prevent discoloration of the glass.

The cap or sleeve 13 with the contained and attached elements forms an attachment which can be applied to any type of spark plug having an insulating core with an axial electrode, and in case of breakage of the core said attachment can be removed and applied to a new plug. The auxiliary or pilot spark gap is entirely inclosed so that it cannot short-circuit and be rendered inoperative by the entrance of moisture or dirt. The outer surface of the glass 16 is exposed so that it can be easily kept clean, while the ventilation of the chamber above the spark electrode prevents the glass from becoming foul on its inner face, so that the spark is at all times visible. The attachment is very compact and projects above the top of the insulating core only a short distance and therefore avoids unnecessary projecting portions which would be liable to injury when working around the engine, or which would be broken in case the plug is accidentally dropped.

The right is reserved to make such changes in the form and proportion thereof as will fall within the scope of the claims hereto appended.

Having described the invention, what is claimed is:—

1. In a spark plug, a cap removably mounted upon the insulating core, said cap being slitted to provide adjustment, a clamp for securing the cap upon the core, means carried by said clamp for engagement with said core, and means located at the open end of said cap for engagement with the clamp.

2. In a spark plug, a cap removably mounted upon the insulating core, said cap being slitted to provide adjustment, a clamp for securing the cap upon the core, means carried by said clamp for engagement with said core, and means including an outwardly extending flange formed on said cap for engagement with the clamp.

3. In a spark plug, a cap removably mounted upon the insulating core, said core having formed therein a circumferentially arranged groove, a clamp surrounding said cap, means carried by said cap for engagement with said clamp, and lugs formed on said clamp for engagement with the groove in the insulating core.

4. The combination with a spark plug provided with a removable cap, of a clamp securing said cap upon said plug, said clamp including outwardly extending terminal portions, an adjusting screw for securing said clamp in position, a terminal block pivotally secured between said terminal portions upon said screw, a nut for holding the screw in position, and laterally extending flanges carried by the terminal portions and engageable with one edge of said block and nut.

5. In a spark plug, in combination with an insulating core and an electrode extending therethrough and projecting beyond the end thereof, of an auxiliary spark attachment comprising a metal sleeve fitting over the end of said core and open at its outer end and having its inner end contractile, a split clamping ring surrounding the inner end of said sleeve and arranged to engage the core and secure said sleeve to the core, a spark terminal in said sleeve in conducting relation thereto and in sparking relation to the end of said electrode, and a transparent member in said sleeve outside of said terminal and closing the open end of said sleeve or ferrule.

6. In a spark plug, in combination with an insulating core and an electrode extending therethrough and projecting beyond the end thereof, of an auxiliary spark attachment comprising a metal sleeve fitting over the end of said core and open at its outer end, a split clamping ring or band surrounding said sleeve, a compression screw serving to contract said ring or band to secure the sleeve or ferrule to the core, a binding-post secured to said ring or band by said compression screw, a spark terminal in said sleeve in conducting relation thereto and in sparking relation to the end of said electrode, and a transparent member in said sleeve outside of said terminal and closing the open end of said sleeve.

7. In a spark plug, in combination with an insulating core provided near its outer end with a recess, and an electrode extending through said core and projecting beyond the end thereof, of an auxiliary spark attachment comprising a metal sleeve fitting over the end of said core and open at its outer end and having its inner end contractile, of a split clamping ring or band surrounding the inner end of said sleeve or ferrule and having interlocking engagement therewith and provided with means entering the recess in said core and serving to secure said sleeve to said core, a spark terminal in said sleeve in conducting relation thereto and in sparking relation to the end of said electrode, and a transparent member in said sleeve outside of said terminal and closing the open end of said sleeve.

8. In a spark plug, in combination with an insulating core and an electrode extending therethrough and projecting beyond the end thereof, of an auxiliary spark attachment comprising a metal sleeve fitting over the end of said core and open at its outer end, means for securing said sleeve to said core, a spark terminal in said sleeve in conducting relation thereto and in sparking relation to the end of said electrode, and a transparent member closing the outer end of said sleeve and spaced from said sparking terminal, said sleeve outside of said sparking terminal being provided with ventilating openings.

9. In a spark plug, in combination with an insulating core and an electrode extending therethrough and projecting beyond the end thereof, of an auxiliary spark attachment comprising a metal sleeve fitting over the end of said core and open at its outer end, means for securing said sleeve to said core, a spark terminal in said sleeve in conducting relation thereto and in sparking relation to the end of said electrode, a transparent member closing the outer end of said sleeve, and a spacing ring in said sleeve between said sparking member and said transparent member, said sleeve and spacing ring being provided with ventilating openings.

In testimony whereof I have hereunto set my hand.

ALFRED LEANDER RIGGS.

Witness:
GLENN H. LERESCHE.